May 23, 1933. M. S. CLARK 1,911,061

METHOD OF MAKING AUTOMOBILE CHASSIS

Filed July 17, 1930

INVENTOR.
Malcolm S. Clark
BY
Fay Oberlin & Fay
ATTORNEY.

Patented May 23, 1933

1,911,061

UNITED STATES PATENT OFFICE

MALCOLM S. CLARK, OF WARREN, OHIO

METHOD OF MAKING AUTOMOBILE CHASSIS

Application filed July 17, 1930. Serial No. 468,476.

This invention, relating as indicated, to method of making automobile chassis, has more particular reference to an improved method adapted to be employed for the purpose of fabricating the several elements of the vehicle chassis frame, such method employing electric welding which, as is well known to those familiar with the art of iron and steel working, is superior to any other form of construction in cost as well as in the strength of the resultant structure.

My invention relates to the method of securing the cross members of such vehicle chassis frame to the side members thereof, and later to the specific construction of the corners of such frame, which construction is particularly applicable to be employed in connection with the method comprising my invention. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
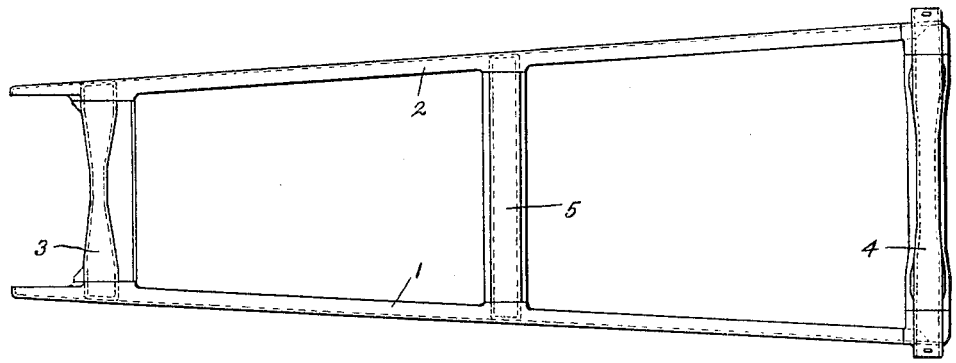
Figure 7:
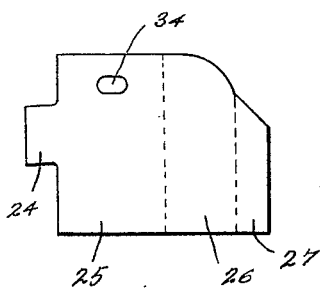
Figure 6:
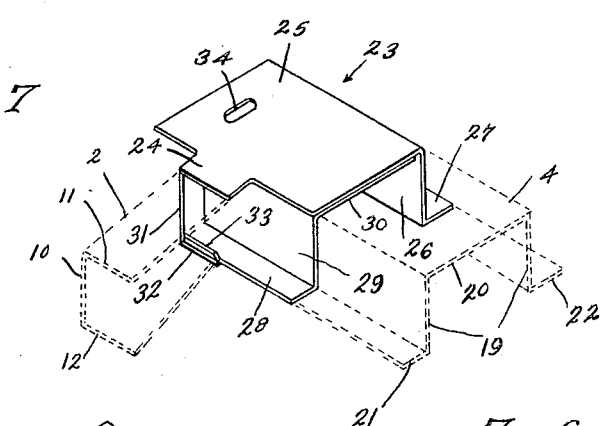
Figure 8:
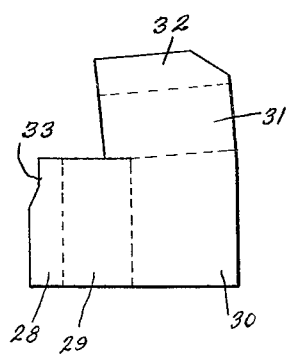
Figure 2:
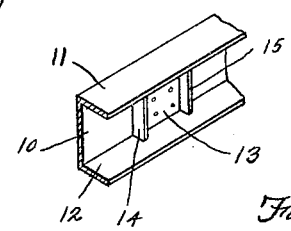
Figure 3:
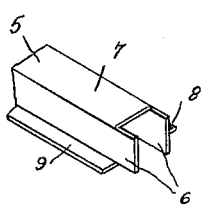
Figure 4:
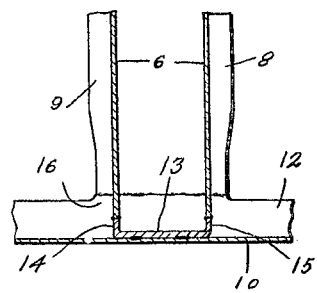
Figure 5:
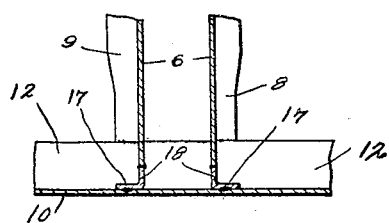

In said annexed drawing:

Fig. 1 is a plan view of a vehicle chassis frame constructed in accordance with the principles of my invention; Fig. 2 is a fragmentary isometric view of a portion of the side frame members of the frame shown in Fig. 1; Fig. 3 is a fragmentary isometric view of one terminal of a cross member of the frame shown in Fig. 1; Figs. 4 and 5 are fragmentary sectional views showing alternative forms of connection between the cross members and the side frame members of the chassis frame; Fig. 6 is an isometric view of one corner of the chassis frame shown in Fig. 1; and Figs. 7 and 8 are respectively plan views of flat elements which, when bent along the dotted lines indicated thereon, and brought into proper relationship with each other, form the structure illustrated by full lines in Fig. 6.

Referring more specifically to the drawing and more especially to Fig. 1, the vehicle chassis frame here illustrated is of the form commonly employed in automobile construction and consists of longitudinally extending side frames 1 and 2 which are suitably cross braced at their ends by cross members 3 and 4 and intermediately of such ends by the cross member 5. The cross member 5, as most clearly illustrated in Fig. 3, consists of web members 6 which are united along one edge by a flange member 7 and which have laterally projecting at their other edges flange members 8 and 9. The terminal portions of the flange members 7, 8 and 9 are cut away for the purpose hereinafter more fully explained so as to leave the terminal portions of the web members 6 projecting longitudinally of the ends of such flange members.

The side frame members 1 and 2, as most clearly shown in Fig. 2, consist of channels having web portions 10 and inwardly directed flange portions 11 and 12. The web 10 of the side frame members 1 and 2 may have secured thereto by spot welding or otherwise vertically disposed channel members 13 which have inwardly directed legs 14 and 15. The inwardly directed legs 11 and 12 of the side frame members 1 and 2 may have laterally extending projections 16 for short lengths thereof immediately above and below the channel member 13.

With the side frame members 1 and 2 provided with inwardly directed projections such as 14 and 15, and the terminal portion of the cross member 5 formed in the manner illustrated in Fig. 3, the terminal of such cross member may be brought into abutting relation with the several inwardly directed portions of the side frame members, namely, the flanges 11, 12, 14 and 15. With the two elements in abutting relation, the web member 6 will be in abutting relation to the inwardly directed legs 14 and 15 of the channel 13, the end of the flange 7 will be in abutting relation with the laterally extending projection 16 formed on the flange 11 and the flanges 8 and 9 will be in abutting relation to a similar projection 16 formed on the lower leg 12 of the side frame member. After the parts have been brought into abutting relation as described, such abutting portions may be suitably flash or butt welded to form a rigid connection.

Instead of having the inwardly directed projections on the web 10 of the side frame member which abut the ends of the web member 6 formed by the inwardly directed legs of a channel such as 13, I may employ single angles such as are illustrated in Fig. 5, which consist of legs 17 secured by spot welding or otherwise to the web 10, and inwardly directed legs 18 which are adapted to function as the projections 14 and 15 to abut the ends of the web members 6. By cutting back the ends of the flanges 7, 8 and 9 for a slightly greater distance, the projections 16 may be omitted from the inwardly directed legs 11 and 12 of the side frame members so that the ends of the flanges 7, 8 and 9 will be in abutting relation to the edges of such legs 11 and 12 when the ends of the web member 6 are in abutting relation to the inwardly directed flanges or projections 14 and 15 or 18. The obvious advantage of the latter construction which omits the projections 16, is that a common form of channel may be employed for the side frames 1 and 2 thereby reducing the cost of forming a special channel having projections such as 16.

The transversely extending member 4 may be formed with a cross section which is similar to the cross section of the member 5, including web members 19, web connecting flange member 20, and laterally extending flange members 21 and 22. In order to provide a properly reinforced and sufficiently rigid corner connection between cross member 4 and the side frame members 1 and 2, a section such as is generally indicated at 23 presenting the proper cross sections into abutting relation with the side frame members and the cross member as well as suitable anchorage means for the body mounted thereon may be formed of stamped steel plates bent and suitably interconnected by spot welding in the manner about to be described. The upper or outer member or element of the corner construction, so called for convenience only, consists of a flat steel plate formed in the manner illustrated in Fig. 7, which plate has among other features of design, a laterally extending leg 24 and flat portions 25, 26, and 27 respectively indicated as being separated by dotted lines which are merely indicative of the lines along which such flat plate is bent to assume the shape indicated in Fig. 6. The inner member of the corner construction, so called for convenience only, consists of a flat steel plate stamped to the shape most clearly illustrated in Fig. 8, which consists of portions 28, 29, 30, 31 and 32, indicated as separated by dotted lines indicative of the lines along which such plate will be bent to assume the shape as indicated by the full line construction in Fig. 6.

It will be noted that a portion of the section 28 is cut away as indicated at 33, so that when the several sections are properly bent into the form illustrated in Fig. 6, only one thickness of such material, namely the edge of the section 32, will be presented into abutting relation with the end of the lower flange 12 of the side frame member, so that localized contact may be had at this point to facilitate and insure proper welding or uniting of these contiguous edges. After the stamped portions, as illustrated in Figs. 7 and 8, are properly bent along the dotted lines indicated thereon, they may be maintained in assembled relation by spot welding or otherwise, so as to present the form illustrated by the full lined structure in Fig. 6. With the assembled elements in the above described form suitable cross sections are presented respectively to the side frame members and the cross member 4, so that the ends of such last named members may be brought into abutting relation with the cross sections of the corner structure presented for that purpose, and the abutting edges may then be welded by flash welding. The aperture 34 provided in the section 25 of the upper corner member, as illustrated in Fig. 7, serves as a means for securing a bolt, or the like, which passes therethrough, and which is employed to secure the automobile body to the frame.

By employing the above described method of fabricating the several elements comprising the vehicle chassis frame, a resultant structure is obtained which is superior to any which have heretofore been made with respect to the cost of manufacture as well as to the simplicity of construction and strength of the finished structure. By welding together the abutting ends of the several elements which are presented in abutting relation to each other in the manner hereinbefore described, the assembly of the several elements of the frame may be accomplished more readily, more economically, and with a greater resultant strength than has been possible with any method or methods heretofore employed.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. The method of forming a frame for a vehicle chassis which includes providing side frame members, securing means to said side frames to provide spaced projections spaced longitudinally of said side frame members and directed towards the longitudinal axis of the chassis, providing a cross member having portions of its terminal cross sections adapted to coincide with said projections, bringing such terminals and said projections into abutting relation, and then welding such abutting portions.

2. The method of forming a frame for a vehicle chassis which includes providing side frame members, securing channels to said side frame members with the legs thereof extending inwardly towards the longitudinal axis of said chassis, providing a cross member having portions of its terminal cross sections adapted to coincide with the inwardly directed legs of said channels, bringing such terminals and said projections into abutting relation, and then welding such abutting portions.

3. The method of forming a frame for a vehicle chassis which includes providing side frame members having longitudinally extending inwardly projecting flanges, securing means to said side frames intermediately of said flanges to provide projections extending transversely of said side members and towards the longitudinal axis of said chassis, providing a cross member having portions of its terminal cross sections adapted to coincide with said flanges and projections on said side frames, bringing said terminals and said flanges and projections into abutting relation, and then welding such abutting portions.

4. The method of forming a frame for a vehicle chassis which includes providing side frame members, securing channels to said side frame members with the legs thereof extending inwardly towards the longitudinal axis of said chassis, providing a cross member in the form of a channel having longitudinally projecting portions adapted to coincide with said projections, bringing said longitudinally projecting portions into abutting relation to said projections, and then welding such abutting portions.

Signed by me this 14th day of July, 1930.

MALCOLM S. CLARK.